United States Patent
Zhang et al.

(10) Patent No.: US 6,882,857 B2
(45) Date of Patent: Apr. 19, 2005

(54) METHOD AND APPARATUS FOR EFFICIENT PROCESSING OF DATA FOR TRANSMISSION IN A COMMUNICATION SYSTEM

(75) Inventors: Yi Zhang, San Diego, CA (US); Nitin Kasturi, Los Gatos, CA (US); Alkinoos Hector Vayanos, San Diego, CA (US); Subramanya P. N. Rao, Santa Clara, CA (US)

(73) Assignee: Qualcomm, Incorporated, San Diego, CA (US)

( * ) Notice: Subject to any disclaimer, the term of this patent is extended or adjusted under 35 U.S.C. 154(b) by 172 days.

(21) Appl. No.: 10/305,656

(22) Filed: Nov. 26, 2002

(65) Prior Publication Data

US 2004/0102205 A1 May 27, 2004

(51) Int. Cl.$^7$ .............................. H04B 1/38; H04B 7/00; H04M 1/00
(52) U.S. Cl. ..................... 455/522; 455/67.11; 370/336; 370/337
(58) Field of Search .............................. 455/522, 67.11, 455/67.13, 517, 513, 512, 500, 445; 370/321, 442, 337, 347, 301, 336

(56) References Cited

U.S. PATENT DOCUMENTS 6,259,927 B1 * 7/2001 Butovitsch et al. ......... 455/522
6,490,461 B1 * 12/2002 Muller et al. ............... 455/522
6,745,052 B1 * 6/2004 Corbaton et al. ........ 455/562.1
6,754,506 B1 * 6/2004 Chang et al. ............... 455/522
6,760,590 B1 * 7/2004 Miyoshi et al. ........... 455/452.1

FOREIGN PATENT DOCUMENTS

| WO | 03/041317 | 5/2003 |
| WO | 03/049320 | 6/2003 |

* cited by examiner

Primary Examiner—Nick Corsaro
Assistant Examiner—Edan Orgad
(74) Attorney, Agent, or Firm—Philip R. Wadsworth; Thien T. Nguyen; S. Hossain Beladi

(57) ABSTRACT

Various embodiments are provided for determining a set of acceptable transport format combinations for transmission on a current time frame. A set of acceptable modified rate power adjustment values is determined based on a maximum power level, an accumulated power commands and an initial power control command. A set of acceptable channel gain factors is determined based on the set of acceptable modified rate power adjustments values, and the set of acceptable transport format combinations is determined based on the set of acceptable channel gain factors. A possible set of modified rate power adjustment values is associated to a set of channel gain factors for determining the set of acceptable channel gain factors based on various design of a transmitter chain used for transmission of data from the mobile station.

20 Claims, 6 Drawing Sheets

| $\beta_c$ | $\beta_d$ | TFCI | TC 1 | TC 2 | TC 3 | TC 4 | TC 5 | TC 6 | TC 7 | TC 8 |
|---|---|---|---|---|---|---|---|---|---|---|
| 0 | 15 | 1 | $TF_1$ | $TF_2$ | ... | ... | · | | | |
| 1 | 14 | 2 | | | | | | | | |
| 2 | 13 | 3 | | · | · | $TF_i$ | · | · | · | |
| · · · | · · · | | | | | | · · · | | | |
| 13 | 2 | N-2 | | | | | | | | |
| 14 | 1 | N-1 | | | | | | | | |
| 15 | 0 | N | | | | | | | | |

$TF_i$ VALUES: 0, 1, 2, ..., X

| $\beta_c, \beta_d$ | MOD. RATE POWER ADJ. |
|---|---|
| (15, 0) | 0 |
| (15, 1) | 0 |
| ... | ... |
| (15, 15) | 36 |
| (14, 15) | 40 |
| ... | ... |
| (1, 15) | 282 |
| (0, 15) | --- |

METHOD AND APPARATUS FOR EFFICIENT PROCESSING OF DATA FOR TRANSMISSION IN A COMMUNICATION SYSTEM

FIELD

The present invention relates generally to the field of communications, and more particularly, to data communications in a communication system.

BACKGROUND

The data communicated between two end users may pass through several layers of protocols for assuring proper flow of data through the system. A packet of data may be transmitted over several time slots. Each time slot is transmitted over the air, for example, from a base station to a mobile station on a downlink or from a mobile station to a base station on an uplink. The transmission on the uplink may be in accordance with a selected transmission time interval (TTI) parameter. For example, TTI parameter may have four possible values, 0, 1, 2 and 3. If TTI parameter is set to 0 for example, the transmission interval may be for one time frame on the uplink from a mobile station. Similarly, the transmission interval for TTI values 1, 2 and 3 may be respectively for 2, 4 and 8 time frames. One time frame may have fifteen time slots, and may be for a limited and defined duration. The data generated for transmission over the air may be multiplexed into multiple transport channels. Each transport channel has a set of blocks of data, where the blocks may have the same size. Since the amount of data for transmission may vary for each transmission, the set of data blocks may be for different number of blocks and different size at different times.

The transmissions over the air on the uplink may be in accordance with a variety of parameters defining a transport format combination in a code division multiple access communication system. A transport format identifies a number of data blocks in a set of data blocks and the size of the data blocks in the set of data blocks. A transport format is selected such that the receiving station is able to decode the data with minimal error or at an acceptable error level. The selection of a transport format depends on the data rate, the amount of data in each slot time and the transmission power level. As a result, there may be a large number of transport format combinations that the system may need to support. When the transmitter receives the data for transmission over the air on the uplink, the transmitter eliminates a number of transport formats that may not be used for transmission of the received set of data blocks. The process of eliminating the unacceptable transport formats may be performed before every transmission time interval. Therefore, in an example, if TTI parameter is set to 0, the process for determining and eliminating unacceptable transport formats may have to be repeated every time frame on the uplink. The process of eliminating the unacceptable transport formats may take a substantial processing power and time.

Therefore, there is a need for an efficient method, apparatus and system for determining the unacceptable transport formats for transmission of data in a communication system.

SUMMARY

Various embodiments are provided for determining a set of acceptable transport format combinations for transmission on a current time frame. A set of acceptable modified rate power adjustment values is determined based on a maximum power level, an accumulated power commands and an initial power control command. A set of acceptable channel gain factors is determined based on the set of acceptable modified rate power adjustments values, and the set of acceptable transport format combinations is determined based on the set of acceptable channel gain factors. A possible set of modified rate power adjustment values is associated to a set of channel gain factors for determining the set of acceptable channel gain factors based on various design of a transmitter chain used for transmission of data from the mobile station. One of the acceptable transport format combinations is selected for transmission of data on the current time frame. Each transport format combinations of the set of acceptable transport format combinations includes a set of transport formats corresponding to a set of transport channels for communications from the mobile station. The transport channels are mapped to a set of physical channels for transmission from the mobile station in accordance with a determined power level and data rate over a set of time slots in the current time frame.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 6 depicts an association of a set of channel factors to a set of modified rate power adjustment values.

DETAILED DESCRIPTION OF THE PREFERRED EMBODIMENT(S)

Generally stated, a novel and improved method and apparatus provide for efficient processing of data for transmission of data in a communication system. A set of transport formats from a large set of possible transport format combinations is eliminated with minimal processing. A combination of transport formats for a set of transport channels is selected from the remaining possible transport format combinations for transmission of data from a mobile station on an uplink transmission. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-IS-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
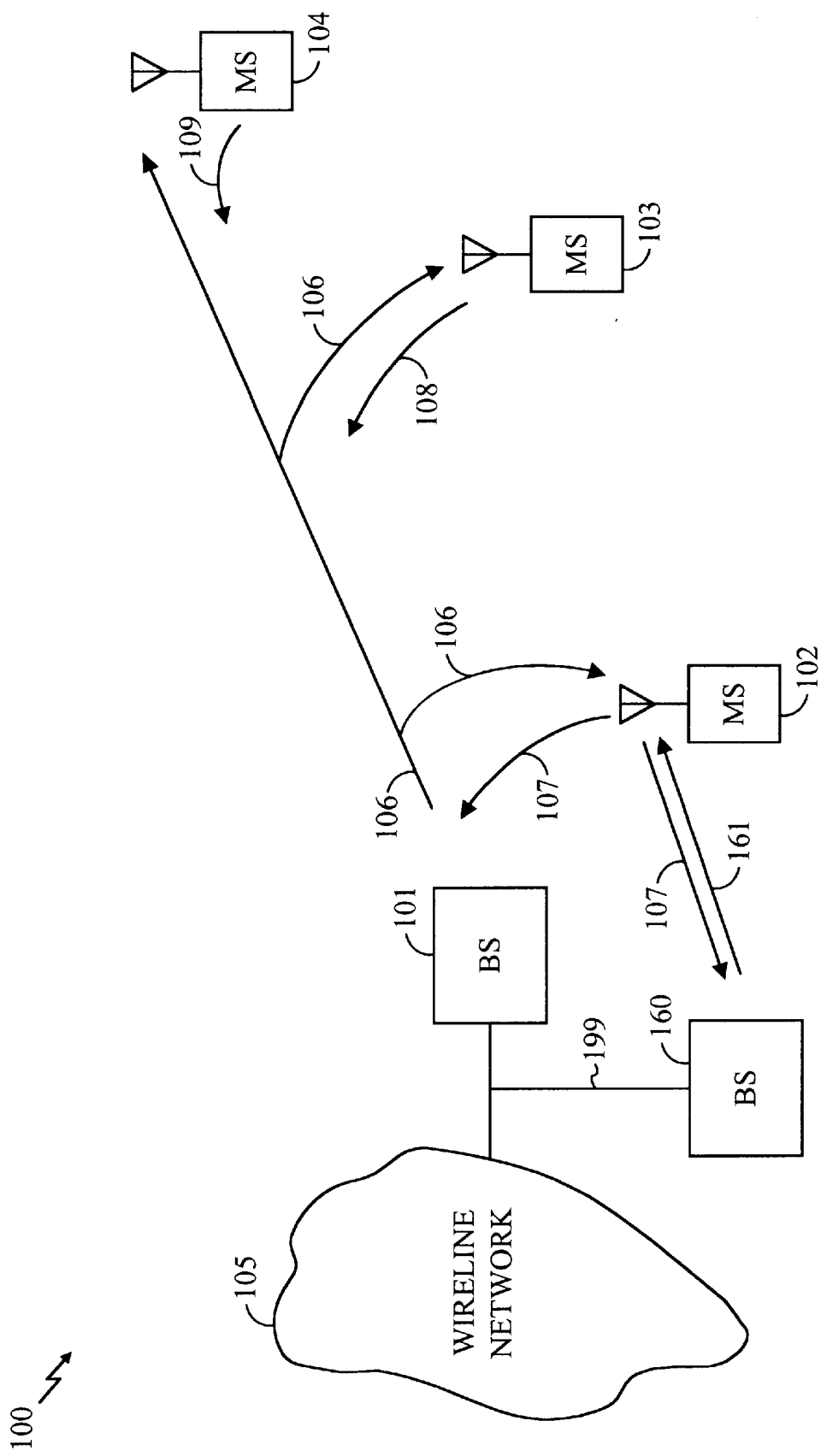
FIG. 1 depicts a communication system capable of operating in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals (AT) and the base station as a data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a downlink signal transmitted from base station 101. The downlink signals targeted for mobile stations 102–104 may be summed to form a downlink signal 106. Each of the mobile stations 102–104 receiving downlink signal 106 decodes the downlink signal 106 to extract the information that is targeted for its user. Base station 160 may also communicate with the mobile stations that are in its coverage area via a downlink signal transmitted from base station 160. Mobile stations 102–104 communicate with base stations 101 and 160 via corresponding uplinks. Each uplink is maintained by a uplink signal, such as uplink signals 107–109 for respectively mobile stations 102–104. The uplink signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the downlink, base station 101 transmits on downlink signal 106, and base station 160 on the downlink signal 161. On the uplink, mobile station 102 transmits on uplink signal 107 to be received by both base stations 101 and 160. For transmitting a packet of data to mobile station 102, one of the base stations 101 and 160 may be selected to transmit the packet of data to mobile station 102. On the uplink, both base stations 101 and 160 may attempt to decode the traffic data transmission from the mobile station 102. The data rate and power level of the up and downlinks may be maintained in accordance with the channel condition between the base station and the mobile station.

Figures 2, 3:
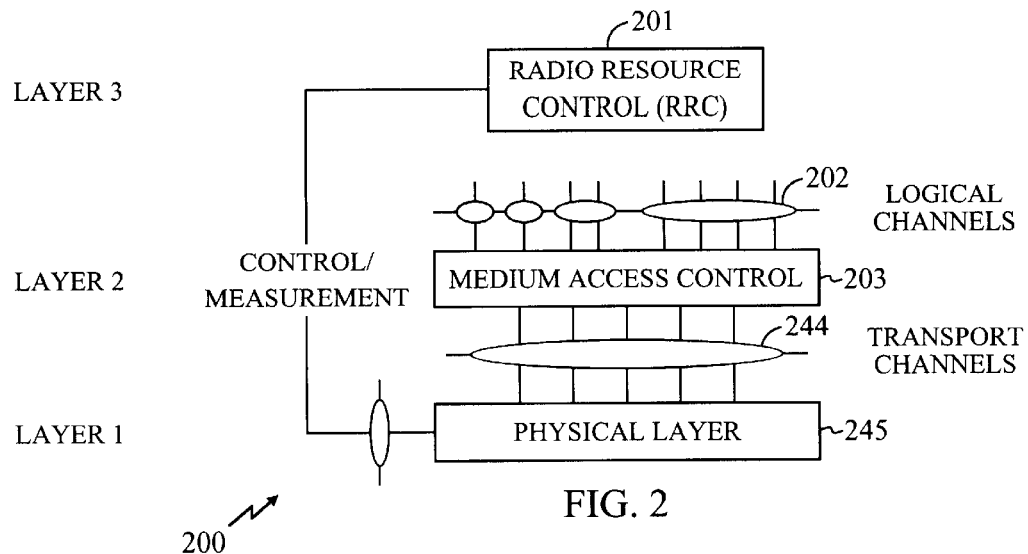
FIG. 2 depicts various protocol layers for communications of control and traffic data between a mobile station and a base station.
FIG. 3 depicts various parameters associated with a set of possible transport format combinations.

FIG. 2 illustrates a radio interface protocol structure 200 for the radio interface of the communications on the uplink and downlink. The radio interface protocol structure 200 may be between User Equipment (UE), such as mobile stations 102–104, and network 105. The protocol structure 200 may have a number of different protocol layers. The radio interface protocol structure 200 is composed of Layers 1, 2 and 3. The interface protocol structure 200 shows the radio interface protocol architecture around the physical layer 245 (Layer 1.) The physical layer 245 interfaces the Medium Access Control (MAC) 203, for being a sub-layer of Layer 2, and the radio resources control (RRC) layer 201 of Layer 3. The circles between different layer/sub-layers indicate different service access point, more fully described in relevant portions of the W-CDMA standard. A number of transport channels 244 are used for passing data between physical layer 245 and MAC layer 203. A transport channel is characterized by how the data is transferred over the radio interface physical channels. Physical channels are defined in the physical layer 245, and are used for communications over the air with a destination. There may be two duplex modes: Frequency Division Duplex (FDD) and Time Division Duplex (TDD). In the FDD mode, a physical channel is characterized by the code, frequency, and in the uplink by the relative phase (I/Q). In the TDD mode, the physical channels are also characterized by the timeslot. The physical layer 245 is controlled by RRC 201. The physical layer 245 offers over the air data transport services. The access to these services is through the use of transport channels 244 via the MAC sub-layer 203. MAC layer 203 offers different logical channels 202 to the sub-layers of Layer 2. A logical channel is characterized by the type of information transferred.

There may be eight transport channels between physical layer 245 and MAC layer 203. The MAC layer 203 may operate on the common transport channels:

Random Access Channel(s) (RACH); Forward Access Channel(s) (FACH); Downlink Shared Channel(s) (DSCH); High Speed Downlink Shared Channel(s) (HS-DSCH); Common Packet Channel(s) (CPCH) for UL FDD operation only; Uplink Shared Channel(s) (USCH), for TDD operation only; Broadcast Channel (BCH); Paging Channel (PCH), and the Dedicated transport channel: Dedicated Channel (DCH). A combination of transport channels may not be allowed. For example, when RACH is being used in the eight transport channels 244, the DCH may not be used. All of the eight transport channels 244 may be used for transferring DCH data. The MAC layer 203 provides data transfer services on logical channels 202. A set of logical channel types is defined for different kinds of data transfer services as offered by MAC layer 203. Each logical channel type is defined by what type of information is transferred. The logical channel types may be traffic data type or control data type. The configuration of logical channel types may be as following:

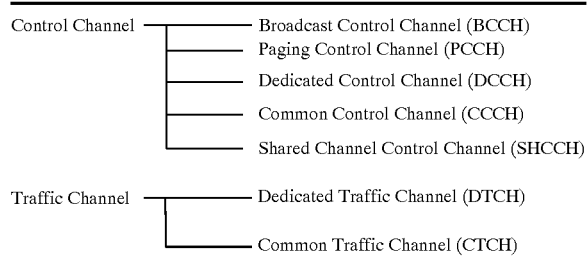

The control channels are used for transfer of control plane information only. The traffic channels are used for the transfer of user plane information only. The MAC layer 203 maps the logical channels 202 to transport channels 244, and maps transport channels 244 to logical channels 202 for maintaining communications between the mobile stations and the network in the communication system 100. For the uplink, the MAC layer 203 maps the logical control data channels and traffic data channels to eight of the transport channels 244, and the resulting eight transport channels to the possible physical channels.

The transmission over the physical channels to a destination may be over a wireless link, such as an uplink from a mobile station or a downlink from a base station. The wireless link has certain limitations. One of such limitations is the amount of power used for the transmission of the link signal. The power level limitation may be due to many factors. In one aspect, the power level may be limited by the system configuration. For example, the mobile stations in communication system 100 may be limited to a maximum power level set by the base stations. Such a configuration by the base stations may be made during a call setup or a reconfiguration time with each mobile station. The system 100 may decide the maximum allowed power level based on the number of mobile stations in the coverage areas. As such, over a long period of time, the maximum allowed transmission power level may change. In another aspect, the mobile stations may be limited to a maximum power level based on its class as defined by a manufacturer. Such a limitation on the power level transmission may be programmable.

Each channel between a mobile station and base station is also characterized by a channel gain. The channel gain is directly related to the amount of data and the power level used for transmission of the data over a predefined time slot. Normally, a larger amount of data transmitted over a time slot requires a higher power than small amount of data over the same time slot in a CDMA communication system. Since the time slots are fixed in duration, the amount of data is translated into a data rate of the time slot. Generally, higher data rates require more power than lower data rates. A transport format indicates a set of data blocks by defining the number of the blocks in the set and the size of each block. All the blocks in a set have the same size. The available number of transport formats of a transport channel, as a result, is directly related to the maximum power level allowed by the mobile station on the uplink transmission. Since not all possible transport formats may be available, some of the transport formats may have to be eliminated.

In one uplink communication, the size of the data blocks, the number of data blocks in each set of data blocks may be changing over time. For example, in a multi-media transmission on the uplink, audio, video and text messages may need to be transmitted. The sets of data blocks of transport channels 244 may be different, corresponding to audio, video and text messages, and changing very quickly based on the need for maintaining a multi-media uplink. One transport channel data may be for a small set of data blocks and another for a large set of data blocks due to the nature of the multi media communication.

Each transport channel may be assigned one of the possible transport formats. Each transport format indicates the number of transport blocks and a transport block size in a set of data blocks that may be used for a transport channel. The number of transport blocks in one transport channel may be set from zero to sixteen blocks. Moreover, the transport block size may vary from a small number of bits of data to a large number of bits of data. As such, a very large number of possible transport format combinations may exist; however, not all of them can be used for transmission due to the limitation on the maximum allowed power level transmission.

Referring to FIG. 3, a transport format combination (TFC) table 300 illustrates the relationships among several parameters. The TFC table 300 may be maintained in a memory coupled to a processor for keeping track of all possible transport format combinations and determining the available transport format combinations for each transmission. For each transport format combination indicator TFCI 301, a series of transport format (TF) value 302 is assigned to all eight possible transport channels (TC) 303. The TF 302 value may be selected from, for example, a number of possible TF values. Each TF value is referred to a block size and a number of blocks in a set of data blocks for a transport channel. The number of blocks for a TF value may be from zero to sixteen blocks. In one example, when the number of blocks in a TF is set to zero, no data is transported on the associated transport channel. Each TFCI 301 is identified by an indicator, for example from 1 to N. The value for N may be limited to 64, thereby, having 64 possible TFCs. For the possible TFs, the minimum and maximum number of possible blocks of data, and the minimum and maximum possible size of each block in each set of data blocks are design choices. Moreover, the minimum and maximum number of possible TFCs is a design choice.

For the uplink transmission, each TFC is associated with a pair of channel gain factors. Since the data streams are divided over control channels and traffic channels, a gain factor is assigned to the control data stream in the control channels and another to the data stream in the traffic channels. The gain factors for the control data stream and traffic data stream may be respectively $\beta_c$ and $\beta_d$. A patent application tilted: Computing Gain Factors for Weighting Data Streams in a Communication System, filed on Jun. 28, 2002, with the assigned Ser. No. 10/185,406, assigned to a common assignee of the present application, incorporated by reference herein, discloses at least one method for calculating the gain factors $\beta_c$ and $\beta_d$.

In an exemplary embodiment, wireless communication system 100 is a W-CDMA system. The W-CDMA specification details the formats and procedures for transmitting data on the uplink and the downlink. One such procedure deployed in W-CDMA systems is to weight traffic data and control data streams differently, according to certain prioritization schemes, by determining gain factors to be applied to each stream. The gain factors used in a mobile station 102–104 are either signaled by a base station 101, or computed in the mobile station. In an exemplary embodiment, in preparing data for transmission on the uplink physical channel, three operations are performed, among others. First, channelization transforms every data symbol into a number of chips. This increases the bandwidth by a spreading factor of between 4 and 256. The data symbols are spread with an Orthogonal Variable Spreading Factor (OVSF) code (both the in-phase (I) and quadrature (Q) components are spread). Second, a gain factor is applied to both the traffic data and control data streams in respectively traffic and control channels. One stream will be at the maximum (gain factor of 1.0), while the other gain factor will vary between zero and one. The gain factors may vary on a frame-by-frame basis. The gain factors are independent from modifications due to the dynamic power control. A dynamic power control may take place once every time slot. Third, a scrambling code is applied to the channelized, weighted data and control streams.

The gain factors can be signaled from a base station or computed in mobile station in communication system 100. In an exemplary embodiment, gain factors, $\beta_c$ and $\beta_d$, respectively, are signaled as shown in Table 1.

TABLE 1

| Signaling Values for $\beta_c$ and $\beta_d$ | Quantized Amplitude Ratios |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

Figure 4:
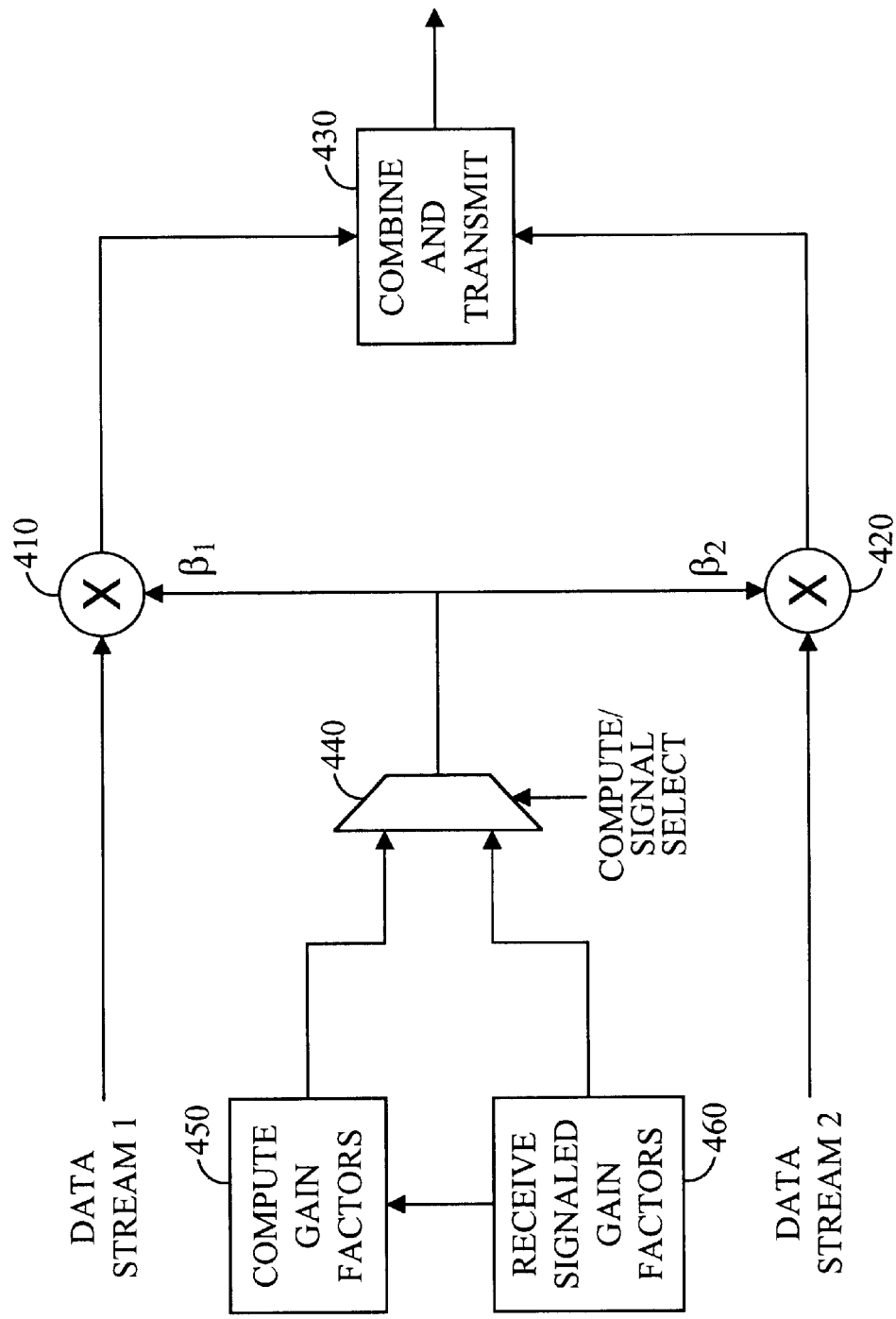
FIG. 4 depicts a portion of a transmitter for applying gain factors to two streams of data, selected in accordance with various aspects of the invention.

FIG. 4 depicts a transmitter portion 499 of an embodiment of a generalized mobile station configured for use with computed or signaled gain factors. Two data streams, data stream 1 and data stream 2, are multiplied by gain factors, $\beta_1$ and $\beta_2$, in multipliers 410 and 420, respectively. One data stream may be traffic data stream and another may be control data stream. The gain factors may be respectively the gain factors for the traffic and control data streams. The resultant weighted signals are combined and transmitted in a combine and transmit block 430. Gain factors, signaled from a base station or calculated by the mobile station, are received and stored in receive signaled gain factors block 460. The gain factors can be directed to multipliers 410 and 420 through mux 440 when selected by compute/signal select. One or more signaled gain factors can also be made available to compute gain factors block 450, for use in computing gain factors at the mobile station. The computed gain factors can also be made available to multipliers 410 and 420 through mux 440 when selected by compute/signal select.

In an exemplary embodiment, one gain factor is used to weight one or more traffic data streams and a second gain factor is used to weight one or more control data streams. Those of skill in the art will recognize that more than two gain factors can also be used, and that gain factors can be applied in various combinations to data streams, control streams, or a combination of the two. Furthermore, those of skill in the art will recognize that the components described in FIG. 4 can be carried out in software, in a processor, for example, or special purpose hardware, or a combination of both. In the exemplary embodiment, transmission of the control and data streams is carried out in conjunction with a transmit chain, and signaled gain factors are received via a receive chain in a transceiver (not shown.)

The nominal power relation, $A_j$, is given in equation 1:

$$A_j = \frac{\beta_d}{\beta_c} \qquad \text{Equation 1}$$

The nominal power relation is an indication of the relative power assigned to traffic data stream with respect to control data stream. In one exemplary embodiment, more power is applied to traffic data stream, in comparison with control data stream, for transport formats that lead into relatively high transmission bit rates. Generally, large amount of data in a set of data blocks and a large number of blocks as indicated by a TF lead to high transmission bit rates. When $A_j$ is 1.0, the power of control and traffic data streams are equal, and $\beta_c$ and $\beta_d$ are both set to 1.0. As $A_j$ increases above 1.0, $\beta_d$ increases relative to $\beta_c$. As $A_j$ decreases below 1.0, $\beta_d$ decreases relative to $\beta_c$.

The gain factors, $\beta_c$ and $\beta_d$, can be signaled from the base station for each TFC, in which case the factors are directly applied. Alternatively, the gain factors can be computed for the possible TFCs as indicated by TFCI in table 300. One method for calculating gain factors is given in the W-CDMA standard, and included as Equation 2, below:

$$\frac{\beta_{d,j}}{\beta_{c,j}} \cong A_j = \frac{\beta_{d,ref}}{\beta_{c,ref}} \sqrt{\frac{L_{ref}}{L_j}} \sqrt{\frac{K_j}{K_{ref}}} \qquad \text{Equation 2}$$

where:

$\beta_{c,ref}$ and $\beta_{d,ref}$ are the signaled gain factors for a reference TFC;

$\beta_{c,j}$ and $\beta_{d,j}$ are the gain factors for the $j^{th}$ TFC;

$L_{ref}$ is the number of DPDCHs used for the reference TFC;

$L_j$ is the number of DPDCHs used for the $j^{th}$ TFC;

$$K_{ref} = \sum_i RM_i \cdot N_i$$

where the sum is over all the transport channels in the reference TFC;

$$K_j = \sum_i RM_i \cdot N_i$$

where the sum is over all the transport channels in the $j^{th}$ TFC;

$RM_i$ is a semi-static rate matching attribute for transport channel i, provided by a higher layer; and $N_i$ is the number of bits in a radio frame prior to rate matching on transport channel i.

K is a general indicator of the amount of data on the transport channels in a TFC. Each transport channel has a rate matching attribute, $RM_i$, assigned by a higher layer and signaled by the base station, which is a general measure of the emphasis for bits in that transport channel. $RM_i$ is used in the rate matching process to determine the proper repetition or puncturing of bits. $N_i$ is the number of bits prior to rate matching. The product of $RM_i$ and $N_i$ is thus an indication of the amount of data, weighted by emphasis, of the transport channel. K is a sum of the products for all the transport channels in a TFC as indicated by a TFCI and so is a general indicator of amount of data, weighted by emphasis, of the TFC. As shown in Equation 1, $A_j$ can be computed by multiplying $A_{ref}$ (the ratio of $\beta_{d,ref}$ to $\beta_{c,ref}$) by a factor that relates the number of channels (DPDCHs) and the weighted amount of data on those channels of the reference TFC to the $j^{th}$ TFC, for which the gain factors are being computed.

When $A_j$ is greater than 1, $\beta_{d,j}$ is set to 1.0 and $\beta_{c,j}$ is set to the largest value for which $\beta_{c,j}$ is less than or equal to $1/A_j$. (See Table 1 for the set of quantized values applicable to the gain factors.) In the W-CDMA specification, $\beta_{c,j}$ cannot be set to zero when computing the gain factors. Therefore, if a zero value would result for $\beta_{c,j}$, the next highest amplitude should be chosen, which in this example is 1/15. Alternate embodiments need not follow this rule. When $A_j$ is less than or equal to 1.0, then $\beta_{c,j}$ is set to 1.0 and $\beta_{d,j}$ is set to the smallest value for which $\beta_{d,j}$ is greater than or equal to $A_j$.

In an exemplary embodiment, one $\beta_c/\beta_d$ pair is used for each TFC as indicated by a TFCI 301 in table 300. A basic unit of data may be called the Transport Block (TB). A Transport Block Set (TBS) is a set of transport blocks sent on a transport channel, for example, for delivery to physical channel at the physical layer 245. A transport block set has a corresponding transport block size, which is the number of bits in each transport block within the transport block set; all transport blocks within a transport block set are equally sized. The total number of bits within a transport block set is given by the Transport Block Set Size (TBSS).

The Transmission Time Interval (TTI) is the period of time over which transport block sets are delivered from the transport channel for mapping onto the physical channel, and the period over which they are transmitted over the air. The TTI can vary for different transport block sets, depending on the latency requirements of the respective data. In the exemplary embodiment the TTI can be equal to 10, 20, 40, or 80 milliseconds, corresponding to one, two, four and eight data frames.

A transport format (TF) 302 defines the parameters for delivery of a transport block set. Each of the TFCI 301 indicates a valid combination of transport formats 302 that can be simultaneously submitted for transmission on the physical channel for all of the identified transport channels 303. In an exemplary embodiment, this is the combination of transport formats allowed for mapping to the Coded Composite Transport Channel (CCTrCh). The TFCI 301 contains one transport format 302 for each transport channel. One pair of gain factors ($\beta_c$ and $\beta_d$) is assigned for each TFCI 301. A Transport Format Combination Set (TFCS) is a set of TFCI 301 that may be used when submitting data from the various transport channels simultaneously, for transmission on a CCTrCh. Table 300 depicts a large number of possible TFCI 301 for a TFCS. For each TTI, there are a number of unacceptable TFCI due to the limitations of the transit power level.

Figure 5:
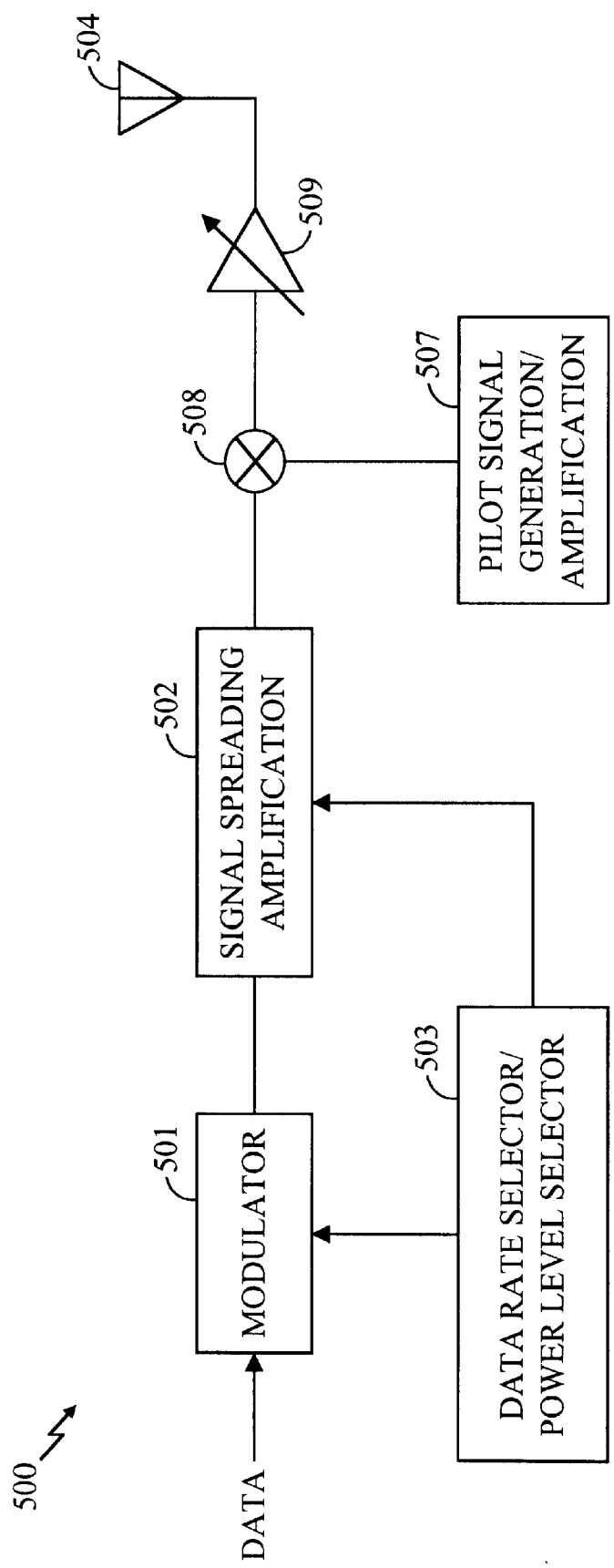
FIG. 5 depicts a transmitter for transmission of data over a time frame with a selected transport format combination in accordance with various aspects of the invention.

FIG. 5 illustrates a block diagram of a transmitter 500 for transmitting the up and downlink signals. The channel data for transmission from transmitter portion 499 are input to a modulator 501 for modulation. The modulation may be according to any of the commonly known modulation techniques such as QAM, PSK or BPSK. The data is encoded at a data rate in modulator 501. The data rate may be selected by a data rate and power level selector 503. The allowed data rate very often is based on the channel condition and available power level, among other considered factors.

The data rate and power level selector 503 accordingly selects the data rate in modulator 501. The output of modulator 501 passes through a signal spreading operation and amplified in a block 502 for transmission from an antenna 504. The data rate and power level selector 503 also selects a power level for the amplification level of the transmitted signal in accordance with the feedback information. The combination of the selected data rate and the power level allows proper decoding of the transmitted data at the receiving destination. A pilot signal is also generated in a block 507. The pilot signal is amplified to an appropriate level in block 507. The pilot signal power level may be in accordance with the channel condition at the receiving destination. The pilot signal may be combined with the channel signal in a combiner 508. The combined signal may be amplified in an amplifier 509 and transmitted from antenna 504. The antenna 504 may be in any number of combinations including antenna arrays and multiple input multiple output configurations.

The selected transmit power level may be based on a number of factors. Some of these factors may be dynamic and some may be semi static. For example, the power level of transmission is controlled, up or down, 15 times over a data frame, once every time slot. Such a power control may be based on feedback received from a destination regarding the condition of the received channel. If the channel is weakening, the number of up commands is larger than the number of down commands in the frame. One of the factors, TxAccum, may define the normal sum of the up and down commands. The other factors may include an initial network controlled power command. Such a command may be sent to the mobile station at the beginning of the transmission. One other factor may include a modified power rate adjustment. Such a factor may be based on the characteristics of the transmitter chain of the mobile station. For a particular design, there may be many possible modified power rate adjustment factors. Each one or more possible modified power rate factors may be associated with one or more pairs of power gain factors. Referring to FIG. 6, a table 699 shows a possible association of various gain factors with a number of possible modified rate power adjustments. The association of various gain factors and the modified rate power adjustment is based on the design of the transmitter chain, and may be derived by empirically or theoretical calculation or both. The modified rate power adjustment factor is based on the amount of gain that a particular transmitter chain adds or takes away from the channel, other than the controlled power level adjustments.

At the beginning of each transmission of a data frame, transmitter 500 may determine the TxAccum parameter from the previous transmission of the frame. For example, if five up commands and 10 down commands have received, the value for TxAccum is 5. Each up or down command step may be for a predetermined amount of power level, for example 1 dB. The transmitter 500 has the information about the maximum power level allowed for transmission. Based on the maximum transmit power level, the TxAccum and the initial network controlled power command, the transmitter 500 determines all the possible modified rate power adjustment levels. For example, the maximum possible modified rate power adjustment is determined. Any modified rate power adjustment below the maximum determined value may be used for transmission. Since the modified rate power adjustments are associated with a set of gain factors, as shown in FIG. 6, a set of gain factors corresponding to the modified rate power adjustment above the maximum possible modified rate power adjustment are also determined to be unacceptable for use for the transport channels 244. The identified gain factors that are not acceptable are referenced to table 300 to identify the corresponding set of TFCIs. The corresponding set of TFCIs is not allowed to be used for transport channels 244. As a result, the portion of the TFC table 300 that is not acceptable for use is identified very quickly for determining and selecting a transport format combination for a set of transport channels 244.

Figure 7:
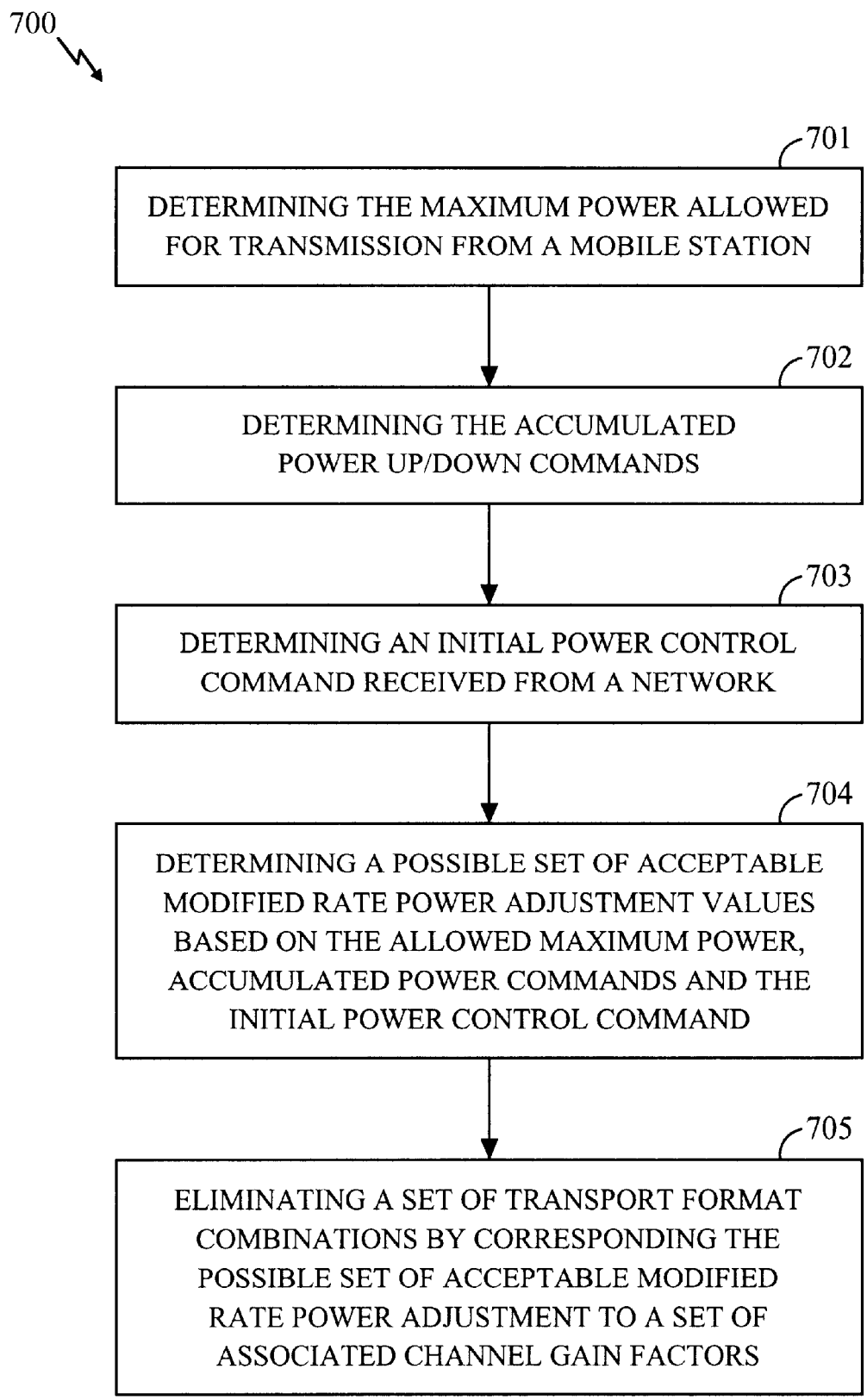
FIG. 7 depicts a flow chart of various steps for determining the acceptable set of transport format combinations for transmission of data from the mobile station.

Referring to FIG. 7, a flow chart 700 shows several steps that may be taken for determining the acceptable set of transport format combinations in table 300 for transmission on a current time frame. At step 701, a controller, such as selector 503 in transmitter 500, determines the maximum power level allowed for transmission from a mobile station, embodying the transmitter 500. The maximum allowed transmission may be set based on the system configuration parameters at the mobile station, the class of the mobile station as programmed in the mobile station or both. At step 702, the controller keeps track of the accumulated power up and down commands of the time frame preceding the current time frame. At step 703, the controller determines the initial power control command received from the base station or the network in the communication system 100. At step 704, the controller determines a possible set of acceptable modified rate power adjustment values based on the allowed maximum transmit power level, the accumulated power commands and the initial power control command. In one aspect, the relationship between modified rate power adjustment, the allowed maximum transmit power level, the accumulated power commands and the initial power control command may be as following:

Power Max=TxAccum+Initial Pwr Cntrl Cmd+Mod. Rate Pwr Adj.

At this point, the maximum allowed modified rate power adjustment may be determined. Any modified rate power adjustment having a value less then the determined maximum value may be used. Referring to table 699, the modified rate power adjustments are associated with a set of channel gain factors. Once the maximum modified rate power adjustment is determined, the acceptable channel gain factors associated with any modified rate power adjustment having a value less then the maximum modified rate power adjustment may be determined and used for transmission from the mobile station for the current frame of data. The gain factors also have an associated set of transport format combinations shown in table 300 of FIG. 3. At step 705, the controller determines an acceptable set of transport format combinations corresponding to the determined set of acceptable channel gain factors.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for determining a set of acceptable transport format combinations for transmission on a current time frame, comprising:

determining a maximum power level allowed for transmission from a mobile station;

determining an accumulated power up/down commands associated with a preceding time frame;

determining an initial power control command;

determining a set of acceptable modified rate power adjustment values based on said maximum power level, said accumulated power commands and said initial power control command;

determining a set of acceptable channel gain factors based on said set of acceptable modified rate power adjustments values;

determining said set of acceptable transport format combinations based on said set of acceptable channel gain factors.

2. The method as recited in claim 1 further comprising:

associating a possible set of modified rate power adjustment values to a set of channel gain factors for said determining said set of acceptable channel gain factors.

3. The method as recited in claim 1 further comprising:

receiving said initial power control command from a base station in a communication system.

4. The method as recited in claim 1 further comprising:
receiving said maximum power level from a base station in a communication system.

5. The method as recited in claim 1 further comprising:
determining said channel gain factors at said mobile station based on a set of received channel gain factors.

6. The method as recited in claim 1 further comprising:
receiving said channel gain factors at said mobile station from a base station.

7. The method as recited in claim 1 further comprising:
determining a set of possible transport combinations for said determining of said set of acceptable transport format combinations.

8. The method as recited in claim 1 further comprising:
selecting one of said acceptable transport format combinations for transmission of data on said current time frame.

9. The method as recited in claim 1 wherein each transport format combinations of said set of acceptable transport format combinations includes a set of transport formats corresponding to a set of transport channels for communications from said mobile station.

10. The method as recited in claim 9 wherein said transport channels are mapped to a set of physical channels for transmission from said mobile station in accordance with a determined power level and data rate over a set of time slots in said current time frame.

11. An apparatus for determining a set of acceptable transport format combinations for transmission on a current time frame, comprising:
means for determining a maximum power level allowed for transmission from a mobile station;
means for determining an accumulated power up/down commands associated with a preceding time frame;
means for determining an initial power control command;
means for determining a set of acceptable modified rate power adjustment values based on said maximum power level, said accumulated power commands and said initial power control command;
means for determining a set of acceptable channel gain factors based on said set of acceptable modified rate power adjustments values;
means for determining said set of acceptable transport format combinations based on said set of acceptable channel gain factors.

12. The apparatus as recited in claim 11 further comprising:
means for associating a possible set of modified rate power adjustment values to a set of channel gain factors for said determining said set of acceptable channel gain factors.

13. The apparatus as recited in claim 11 further comprising:
means for receiving said initial power control command from a base station in a communication system.

14. The apparatus as recited in claim 11 further comprising:
means for receiving said maximum power level from a base station in a communication system.

15. The apparatus as recited in claim 11 further comprising:
means for determining said channel gain factors at said mobile station based on a set of received channel gain factors.

16. The apparatus as recited in claim 11 further comprising:
means for receiving said channel gain factors at said mobile station from a base station.

17. The apparatus as recited in claim 11 further comprising:
means for determining a set of possible transport combinations for said determining of said set of acceptable transport format combinations.

18. The apparatus as recited in claim 11 further comprising:
means for selecting one of said acceptable transport format combinations for transmission of data on said current time frame.

19. The apparatus as recited in claim 11 wherein each transport format combinations of said set of acceptable transport format combinations includes a set of transport formats corresponding to a set of transport channels for communications from said mobile station.

20. The apparatus as recited in claim 19 wherein said transport channels are mapped to a set of physical channels for transmission from said mobile station in accordance with a determined power level and data rate over a set of time slots in said current time frame.

* * * * *